No. 736,067. PATENTED AUG. 11, 1903.
F. T. CABLE.
GAGE.
APPLICATION FILED NOV. 7, 1902.
NO MODEL.
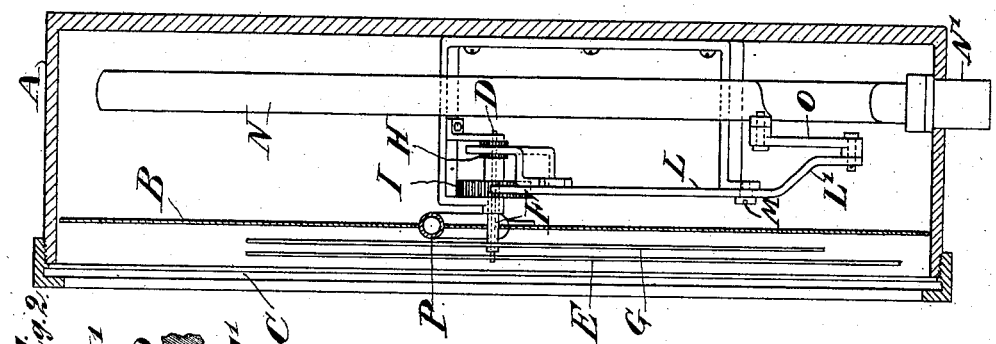
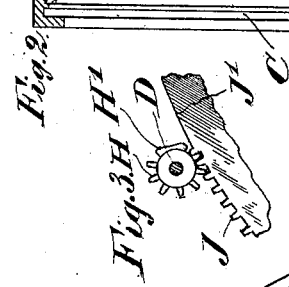
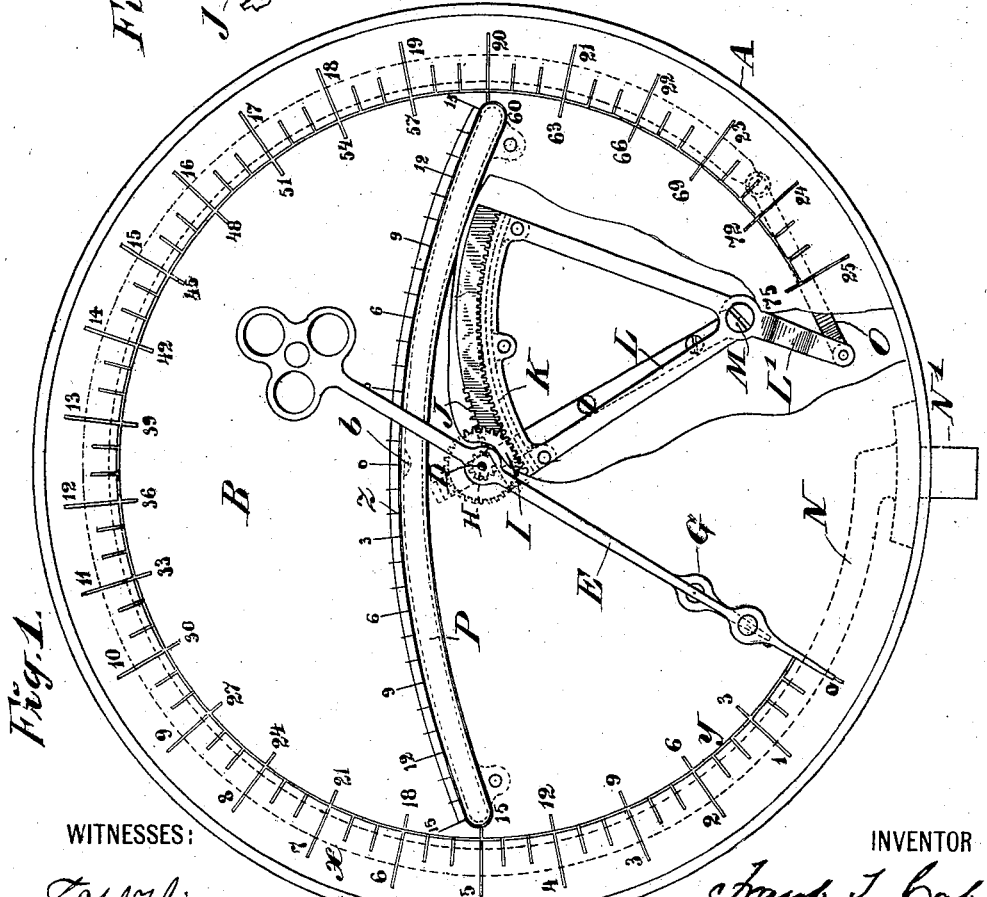
WITNESSES: INVENTOR
Frank T. Cable
BY
ATTORNEY No. 736,067. Patented August 11, 1903.

UNITED STATES PATENT OFFICE.

FRANK T. CABLE, OF NEW SUFFOLK, NEW YORK, ASSIGNOR TO ELECTRIC BOAT COMPANY, A CORPORATION OF NEW JERSEY.

GAGE.

SPECIFICATION forming part of Letters Patent No. 736,067, dated August 11, 1903.

Application filed November 7, 1902. Serial No. 130,370. (No model.)

*To all whom it may concern:*

Be it known that I, FRANK T. CABLE, a citizen of the United States, residing at New Suffolk, in the county of Suffolk and State of New York, have invented certain new and useful Improvements in Gages, of which the following is a specification.

This invention relates to the class of gages which indicate visually certain conditions, and it comprises a specially-constructed pressure-gage and an inclination-gage combined therewith.

The object of the invention is, in part, to provide a gage having two hands operated by a moving means in common and which traverse at different rates of speed scales which have their scale-numbers spaced proportionately to the speed at which the hands move, whereby the lower and more usual pressures may be indicated on a plainer or larger scale than the higher pressures.

The invention resides partly in the mechanism in common for operating both hands of the gage and partly in means for arresting the movement of one hand at a predetermined point, while the other hand is left free to continue its movement.

Another object is to combine with the pressure-gage a gage or inclinometer to show the degree of inclination of the base supporting the gage.

As shown in the accompanying drawings, the invention is represented in a gage suitable for use on a submarine boat for indicating the depth of submergence and the inclination at all times of the longitudinal axis of the boat with the water-level.

In the accompanying drawings, Figure 1 is a face view of the gage, partly broken away to disclose the internal mechanism. Fig. 2 is a sectional view showing the casing in diametrical section and the internal mechanism in elevation. Fig. 3 is a detail view showing a part of the indicator mechanism on a larger scale than the principal views.

A designates a suitable casing provided with a plate or dial B and a glass front C. In the center of the casing is rotatively mounted an arbor D, carrying a hand E, adapted to traverse a scale $x$, having widely-spaced scale-numbers, here shown as extending from "0" up to "25." On the arbor D is rotatively mounted a sleeve F, which carries a hand G, that traverses a scale $y$, having more closely-spaced scale-numbers, here shown as extending from "0" up to "75"—that is, the outer scale $x$ is three times as large as the inner scale $y$. On the arbor D is secured a toothed wheel H, and on the sleeve F is secured a larger toothed wheel I, the said wheels being proportioned in size to the scales $x$ and $y$.

Gearing with the respective wheels H and I for driving the hands are toothed racks J and K, carried by a lever L, fulcrumed in the casing at M, said lever being turned about its fulcrum by a curved tube N, which is fixed at one end in the casing and is coupled at its other end through a link O to an arm L' on the lever L. The tube N is the ordinary tube found in gages of this class or character and is adapted to receive a fluid under pressure at an inlet N' at its fixed end. By its movement under pressure it rocks the lever L and thus imparts the required rotary motion to the arbor and sleeve carrying the respective hands.

When the gage is used on a submarine boat, water from outside will be admitted to the tube N and as the boat dives the pressure will increase, thus moving the hands over the respective scales. Conveniently the scale-numerals may indicate feet in depth of submergence, as the pressure will be proportioned to the depth. Obviously the hands will both indicate the same depth; but up to a certain point the indications may be read from the larger and plainer scale $x$. Above that depth the smaller scale must be relied on. When the hand E shall have reached the limit of its movement or travel, it is arrested, but the other hand G moves on.

Fig. 3 shows the means for arresting the hand E when it shall have reached the number "25" on the scale $x$ and yet permit the continued movement of the hand G. The rack J is short and suffices only to rotate the wheel H to the desired extent when a smooth or toothless portion H' on the said wheel comes to a bearing on a smooth or toothless portion J' on the arc which carries the teeth forming the rack J. This device holds the wheel H against rotation, but permits the lever L to still move and operate the hand G.

It is important to have combined with the pressure-gage which indicates the depth of submergence of the boat another gage to indicate the inclination in degrees with the level of the water of flotation of the longitudinal axis of the boat or vessel, and such a gage is provided by the present invention. This device will now be described.

On the dial B and occupying a slot therein is a curved tube P, of glass, containing a suitable liquid, such as is commonly found in spirit-levels. This tube is marked with graduations $z$, and the bubble $b$ in the tube indicates the degree of inclination of the boat's axis. The gage should be set in the center of the longitudinal oscillation of the boat.

Obviously the relation or proportion between the scales $z$ and $y$ need not be that herein shown; but it is convenient to have one indicating means on a scale three times that of the other. It is also convenient to have the two scales of circular form and parallel, as shown; but the scales are practically one so far as the graduations are concerned, being distinguished mainly by the scale-numerals.

The dial B will be by preference a full plate; but this is not important, so long as it is capable of performing its functions.

Having thus described my invention, I claim—

1. A pressure-gage having two indicating devices, one, for indicating lower pressures, having a plainer and more easily read scale, and the other, for indicating the higher pressures, having a finer scale, means in common for operating the hands of the said indicating devices and moving them at different rates of speed proportioned to the scales, and means for arresting the more rapidly moving hand at a predetermined point without arresting the other hand.

2. A pressure-gage with two indicating devices, said devices having parallel scales of substantially equal length, one for indicating the lower pressures and the other the higher pressures, hands which traverse the respective scales, gearing which moves said hands over the scales at different rates of speed, means, in common with both hands, for operating said gearing, and means for arresting the more rapidly moving hand when it shall have reached the end of its scale.

3. A pressure-gage with two indicating mechanisms each having a hand and a scale traversed thereby, means in common for moving said hands, said means moving one hand a greater distance than the other in a given time, and said scales having their scale-numerals spaced in proportion, respectively, to the speed of the hands traversing the scales, and means for arresting the more rapidly moving hand at a predetermined point without arresting the other hand.

4. A pressure-gage comprising a casing, a dial having on it the two scales $x$ and $y$, a central arbor D, a hand E carried by said arbor, a sleeve F rotative on said arbor, a hand G carried by said sleeve, said hands traversing the respective scales $x$ and $y$, a rocking lever L carrying racks J and K, the said racks, wheels H and I, of different diameters carried by the respective arbor D and sleeve F, and gearing with the respective racks J and K, and means for turning said lever L about its fulcrum, whereby the hands are moved at different rates of speed.

5. A pressure-gage comprising a casing, a dial having on it, two scales $x$ and $y$, a central arbor D, a hand E carried by said arbor, a sleeve F rotative on said arbor, a hand G carried by said sleeve, said hands traversing the respective scales, a rocking lever L, a full rack K, carried by said lever, a rack J which has a toothless portion J', carried by said lever, the wheel I, carried by the sleeve F and gearing with the rack K, the wheel H on the arbor D and gearing with the rack J, said wheel having an untoothed portion H' adapted to bear on the smooth portion of the rack, and means for turning said lever L about its fulcrum, substantially as and for the purpose set forth.

6. The combination with a depth-gage having a dial with scales and means for moving hands over the respective scales, of an inclination-gage comprising a curved and graduated tube set in and carried by the dial of the pressure-gage and containing a liquid and bubble which traverses the graduations on the tube.

In witness whereof I have hereunto signed my name, this 1st day of November, 1902, in the presence of two subscribing witnesses.

FRANK T. CABLE.

Witnesses:
HOWARD G. TUTHILL,
FRANK L. BRAKE.